United States Patent [19]

Todd et al.

[11] Patent Number: 5,301,722
[45] Date of Patent: Apr. 12, 1994

[54] UNDER-DISPENSER CONTAINMENT APPARATUS

[75] Inventors: John A. Todd; Deborah A. Joines, both of Salisbury, Md.

[73] Assignee: Dresser Industries, Inc., Dallas, Tex.

[21] Appl. No.: 813,575

[22] Filed: Dec. 26, 1991

[51] Int. Cl.⁵ .............................................. B67D 5/04
[52] U.S. Cl. ...................................... 141/86; 141/88; 141/311 A; 137/312; 222/108; 220/571
[58] Field of Search ............... 141/86, 88, 311 A; 220/571; 222/108; 422/900; 137/312

[56] References Cited

U.S. PATENT DOCUMENTS

| | | |
|---|---|---|
| 4,161,957 | 7/1979 | Schoellkopf . |
| 4,278,115 | 7/1981 | Briles et al. .......................... 141/86 |
| 4,457,349 | 7/1984 | Vazin .................................... 141/86 |
| 4,520,852 | 6/1985 | Klein .................................... 141/86 |
| 4,793,387 | 12/1988 | LeBlanc . |
| 4,807,675 | 2/1989 | Sharp ................................... 141/86 |
| 4,842,163 | 6/1989 | Bravo .................................. 222/108 |
| 4,842,443 | 6/1989 | Argandona ....................... 141/86 X |
| 4,921,115 | 5/1990 | Fields, III .......................... 141/86 X |
| 4,926,899 | 5/1990 | Argandona . |
| 4,960,346 | 10/1990 | Tamayo . |
| 4,971,225 | 11/1990 | Bravo ................................. 141/86 X |
| 5,099,894 | 3/1992 | Mozeley, Jr. ......................... 141/86 |
| 5,246,044 | 9/1993 | Robertson et al. .................... 141/86 |

FOREIGN PATENT DOCUMENTS 213179  11/1964  Sweden ................................. 141/86

OTHER PUBLICATIONS

Enviro Flex Total Containment (1989).
York Service, Inc., "Introducing the Bravo Pit Box" (no date).

Primary Examiner—Ernest G. Cusick
Attorney, Agent, or Firm—Matthews & Associates

[57] ABSTRACT

An apparatus for the collection of fuel spillings that originate from fuel dispensing apparatus, including gasoline and diesel fuel service station pumps which incorporates a filtering system for preventing solids from accumulating in the bottom of the spill collection pan and allowing fill material to be placed between the collection reservoir of the spill collecting pan and the fuel pumps which contributes to the fire prevention features of this apparatus.

12 Claims, 2 Drawing Sheets

UNDER-DISPENSER CONTAINMENT APPARATUS

BACKGROUND OF THE INVENTION

1. Field of the Invention

This invention relates to and is directed to an apparatus for the collection of fuel spillings from fuel supply devices and, more particularly, an apparatus which collects said spillings underground after they have passed through a filtering system which prevents any large solid materials from collecting in the reservoir area of the apparatus, and also allows for the addition of certain fill material between the surface and the filter system to enhance the fire safety features of this device.

Gasoline spill collectors in various embodiments have previously been available to the general public. The general idea behind prior art devices as well as related underground leak protection apparatus has been to in some way collect the material, normally fuel, which has leaked or spilled in one place. Some of these devices also allow for the material collected to be directed into the vapor recovery system. Vapor recovery systems normally found in use today include those systems disclosed in U.S. Pat. Nos. 3,756,291 and 3,815,327. Other systems have also been developed to detect and prevent leaks from underground storage tanks and their associated lines to prevent possible ground water contamination such as the one disclosed in U.S. Pat. No. 4,161,957.

Generally it is considered desirable to place fuel spill collection apparatus immediately below the fuel dispensing islands normally found in gasoline stations and truck stops. Relatively recently a significant amount of concern has been directed to ground water contamination which can occur due to spills or leaks of fuel supplies from fuel supply sources into the ground and continuing to underground water systems which are eventually tapped as sources for water utilized in human consumption. Spillage can occur when gasoline tanks are filled to overflow levels, as well as when maintenance or service is conducted on the fuel supply pumps. Under such circumstances a significant amount of gasoline over a period of time can leak into the ground below the islands.

The prior art generally has disclosed devices which merely hold and accumulate fuel spillings underground until removed by some means or by virtue of connection to a vapor recovery system, holding tank or the like. This can cause a significant fire hazard. Excess fuel leaked onto the ground is fire hazard enough however, when a significant amount of fuel has been accumulated in a central location an even greater hazard has been developed. Further, without some type of filtration system between the source of fuel and collection point it is possible for solid particles such as rock, sand or even flammable solids to fall into the containment system, thereby contaminating the fuel or obstructing the operation of mechanisms located within the device.

The prior art devices also allow the possibility of flammable objects, or even worse, items which have already begun to burn to fall into the fuel containment reservoir of the fluid collection apparatus. This can cause what is known as a "hot fire" within the containment box itself.

2. Prior Art

Therefore, there exists a need for an improved under-dispenser containment device which not only prevents the accumulation of solid objects in the containment reservoir, but also prevents a hot fire within the containment box.

U.S Pat. No. 4,960,346 issued to Tamayo discloses a double-walled cylindrical bucket style unit having a floor which accepts and corresponds to the fill pipe. The inner-wall of the unit is of the bellows type to prevent vertical expansion and retraction for changing temperatures and the floor of the unit is equipped with a removable inspection plug which permits access to the soil underneath for sampling and the like.

U.S. Pat. No. 4,793,387 issued to L. J. LaBlanc, et al. discloses a overfill spillage protection device utilized to capture fuel spilled from tanks at the fill pipe. This unit surrounds the fill pipe as well as providing a cover therefore. The unit contains a single-walled portion immediately below the cover and a double-walled portion with an internal bellows type wall and an external straight wall. The internal bellows wall allows for expansion and contraction of the unit due to changes in temperature and the like.

U.S. Pat. No. 4,807,675 issued to Sharp discloses an overfill assembly with a removable lid. This patent discloses a device to be used with storage tanks, more specifically underground gasoline storage tanks. The assembly comprises a dump tank with a fill pipe mounted therein. The fill pipe extends through the dump tank's bottom and is in communication with the storage tank. A removable central point compression sealing lid member allows for ready access to the fill pipe. A valve mechanism in the dump tank allows for controlled emptying of any spilled liquid accumulated in the dump tank to the storage tank.

U.S. Pat. No. 4,842,163 issued to Bravo discloses a gasoline collector pit box and submersible unit box. This invention is directed to an apparatus which incorporates an open collecting pit to be placed underneath gasoline fuel dispensers, a means for providing a signal when a predetermined amount of gasoline has accumulated in the collection pit, means to selectively drain accumulated gasoline, and a means to amplify the effect of the gasoline accumulated. This invention does not incorporate a means for filtering the collected gasoline fuel for accumulation in the collection pit. Instead, Bravo discloses a completely open containment pit which is susceptible to "hot fires" and can allow for the contamination of fuel accumulated therein. Bravo further discloses the use of a drain at the bottom of the collection pan which can be hooked into the vapor recovery system. Bravo discloses the use of a ball valve to allow for the opening and closing of the drain as well as a filter on the drain to prevent any contaminants from filtering into the drainage system. Bravo still further discloses a preferred embodiment which can be utilized in connection with a submersible pump. Disclosed as part of this embodiment is an aperture in the bottom of the containment pan to allow for the extension of a horizontal tube through the floor of the collector to accommodate the conduit of the pump that extends down to the underground storage tank. Neither of these embodiments discloses the use of any type of filter means or more specifically any type of filler material through which any spillings must pass before accumulation in the containment reservoir. Without such filtering means, the propensity for hot fires and other types of contamination of the accumulated spillings are enhanced.

U.S. Pat. No. 4,926,899 issued to T. Argandona discloses a transition conduit system for fuel pumps which incorporates a conduit piping arranged between a fuel storage tank and an aboveground fuel pumping unit. This device is essentially a hollow conduit which avoids earth contamination problems due to its leak-proof nature.

SUMMARY OF THE INVENTION

The present invention generally comprises an open top containment pan located underneath the fuel dispenser island of a gasoline station, truck stop or the like. The containment pan accumulates fuel which spills or leaks from the fuel dispenser. The containment of fuel which has spilled or leaked from the dispenser minimizes the effects of such leaks and spills on the environment. Often, such spills can seep through into ground water supplies causing contamination and requiring the expenditure of additional expense on the part of the municipality operating the water supply system or possibly even the refueling station operator or owner in order to clean up the spill. It is well known that even regular maintenance on fuel dispensers can present a significant hazard with respect to fuel leaks and spills. Maintenance on the fuel dispenser itself, including the hoses or pipes, filter changes and meter changes can also cause leakages of fuel held within the pumping unit or filter system.

The containment pan of the present invention will normally be of sufficient depth and dimension to accommodate the fuel dispenser or dispensers above and can have additional length and width such that any overflow leakage which might not fall particularly close to the fuel dispenser itself will also be retained within the pan. Therefore, the geometric design and/or dimensions of this invention can be altered so as to provide the containment protection over any area desired.

In a preferred embodiment of the present invention, the containment pan itself is divided into two sections by virtue of a perforated barrier, also known as a false bottom, located a sufficient distance above the bottom of the containment pan so as to define a reservoir section between the barrier and the bottom of the containment pan. This reservoir section will hold all fuel which is contained within the containment pan until such time as it is removed therefrom. The perforated barrier filters out any solid particles which might otherwise fall into the containment pan reservoir.

The filter of the present invention is also a desirable feature in that it can prevent solid particles which could otherwise cause certain fires, explosions or other types of ignition of the fuel contained in the reservoir from making contact therewith. The addition of filtering material above the perforated barrier provides additional protection as will be discussed below.

One of the features of the present invention, the ability to fill the space between the filter plate and the fuel dispenser with an appropriate material such as sand or gravel inhibits the likelihood of a hot fire. Indeed, the present invention can even be utilized in such a form as to essentially allow for the suffocation of flame in the containment pan if one ever ignites.

The reservoir can be drained by virtue of a fixed extraction tube which can be activated by suction or placing a source of suction on the upper end, or by merely utilizing a permanent draining system whereby the fuel collected is replaced into the fuel storage tank. The latter may be accomplished by merely running a conduit from a drain at the bottom portion of the reservoir directly back into a fuel storage tank or by running the conduit to the vapor recovery system which in turn would return the fuel back to a storage tank. It may also be desirable to angle the bottom of the containment pan reservoir so that the fuel can be directed towards one side, end or corner increasing the ease by which the fuel might be removed.

While the perforated filter barrier in and of itself provides additional fire safety for this apparatus as opposed to those in the prior art by its ability to prevent solid materials such as articles on fire from entering the fuel containment reservoir, further protection can be obtained by placing a fill material above the filter barrier. This fill material can be comprised of sand, gravel or any other suitable material which is not flammable but will allow liquid to pass through. However, prudent operators may still wish to utilize a liquid level switch in order to provide a way in which information regarding the status of the drain below can be transferred above ground.

One embodiment of the present invention also includes a liquid level signal switch which is activated when the fluid accumulated reaches a predetermined level. If a drain is utilized instead of the containment reservoir, the liquid level switch becomes unnecessary. It is important to maintain a cover over this conduit so that solids, including dirt, gravel, and the like from the island level do not fall down into the containment pan reservoir. The preferred embodiment contains a flanged cover which provides flanges for purposes of overlapping the outer diameter of the ground level opening of the conduit.

The liquid level switch apparatus, as well as the liquid extraction tube, when used, are preferably located within a hollow conduit rising from the containment pan reservoir to the top of the containment pan itself opening to the island level of the fuel dispenser area. A second conduit may also be placed through the filler material which provides protection for electrical wiring, the fuel supply piping and any vapor return piping which might be utilized along with the present invention. However, if the operator prefers the use of a drain, then the extraction tube and the conduit within which the extraction tube is located can be removed.

When a drain is utilized, even though the perforated bottom is designed to prevent solids from accumulating in the containment pan reservoir, the drain may become plugged or stopped either through accumulation at the drain point or pipe problems below the drain. If such occurrences do develop, once the fluid level begins to rise, an alarm will sound and those in the vicinity will be placed on alert. In one form of the preferred embodiment, approximately one-half gallon of liquid will activate the liquid level switch. However, this switch can be designed and deployed so as to engage at any predetermined level. Once information regarding the collection of fluids in the containment pan reservoir has been relayed via the liquid level switch the extraction hose can be utilized to remove the fluids.

It is generally well known that fuel dispensers contain impact valves which activate to shut down the fuel mechanism if contact is made with the fuel dispenser such as that which might occur from a vehicle hitting a fuel dispenser in a gasoline station. Often these valves are spring loaded or in some other way biases so as not to require a significant impact or amount or force in order for them to be activated and thereby shut down the dispenser. In the present invention it would be appropriate to either mechanically or electrically provide communication between the liquid level switch and the impact valve so that once the liquid in the containment reservoir rises to a certain predetermined level, the impact valve is automatically engaged and additional fuel cannot be released from the dispenser. This will serve two purposes: (1) prevent additional liquid from accumulating in the containment pan, and (2) alert the operator that the fuel dispenser and containment pan must be checked.

OBJECTS OF THE INVENTION

An object of the present invention is to provide a new and improved under-dispenser containment apparatus which incorporates a means for filtering the spilled or leaked fuel or liquid prior to its accumulation in the containment pan reservoir.

Another object of the present invention is to provide an under-dispenser containment device wherein the means for filtering is a perforated barrier. A further object of the present invention is to provide an under-dispenser containment device for spilled or leaked fuel or other liquid which incorporates a means for signaling high fluid levels within the containment pan reservoir.

A still further object of the invention is to provide an under dispenser containment device which incorporates the means to extract spillings which have collected in the containment pan reservoir.

Yet another object of the present invention is to provide an under-dispenser containment device which utilizes a means to filter the fuel or liquid spillings for accumulation in the containment pan said filter means incorporating fill material through which any fuel spillings or leaks must pass said fill material being maintained at a certain level above the containment pan reservoir to allow for uncontaminated accumulation.

A further object of the present invention is to provide a new and improved under-dispenser containment apparatus which incorporates a means for extracting spillings of fuel or any other liquid which have been accumulated in the containment pan reservoir. These and other objects of the present invention will become more apparent hereinbelow. While certain objects of the present invention are set forth above, it is to be understood that there may be a number of other objects of the present invention which will become obvious after a view of the present patent as well as the claims and drawings incorporated herein.

DETAILED DESCRIPTION OF THE PREFERRED EMBODIMENT

Figure 1:
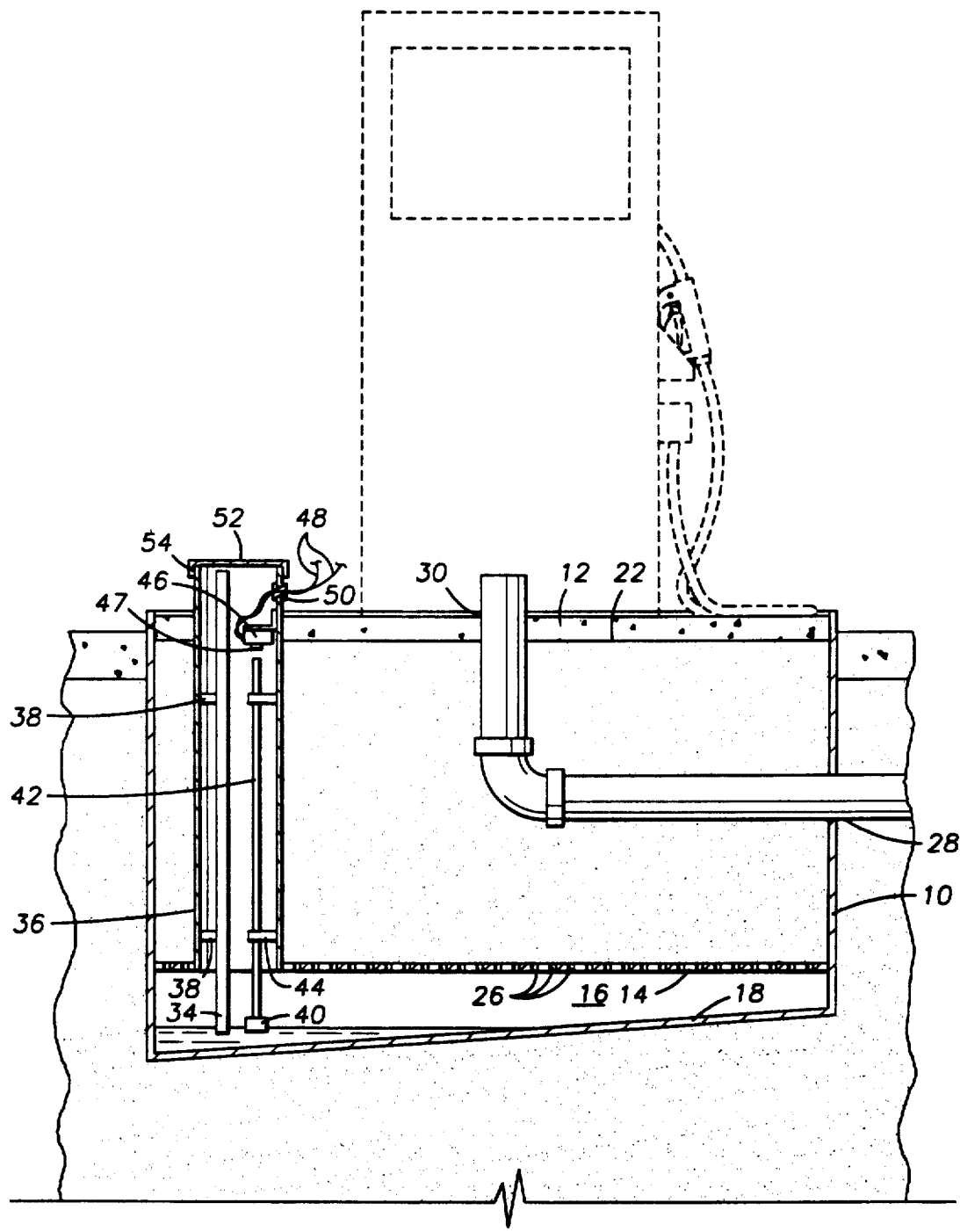
FIG. 1 is a cross sectional frontal view of the under-dispenser containment apparatus of the present invention.

Referring to FIG. 1, the general preferred embodiment of the present invention is disclosed. FIG. 1 shows an open top containment pan 10 deployed underneath a fuel pump 11 and fuel pump island 12. The open top containment pan 10 utilizes a perforated filter barrier 14 also called a false bottom to separate out solids from passing through to the liquid accumulation pan reservoir 16. This perforated barrier 14 can be attached to the sides of the containment pan 10 by welding, bonding or any other appropriate method. The perforated barrier 14 contains a plurality of perforations 26. It is also generally preferred that reservoir 16 contains an angled floor 18 to allow the fluid 20 to accumulate towards one end of the reservoir 16. The containment pan 10 and the barrier 14 can be manufactured of metal, fiberglass or, molded plastic or any other fuel resistent product.

The containment pan 10 has sides 13 and 15 which rise vertically from the bottom of said pan 18 to, and, if desired, even through, ground level 24. The sides 13 or 15 can even extend up to the top of the island 12. The sides of this embodiment can also extend outward at an angle or the dimensions of the pan itself can be such that they encompass, exceed or even greatly exceed the general area of the fuel pump and island 11 and 12, respectively.

The preferred embodiment of FIG. 1 also discloses fill material 22, preferably sand or gravel, disposed between the island level of the fuel dispensing area 24 and the filter barrier 14. Said fill material is prevented from sliding or falling into the reservoir 16 by virtue of the perforated filter barrier 14. As noted above, the fill material is preferably sand or gravel. However, any suitable material, natural or artificial, can be utilized instead. Depending on the material used the perforations 26 of the barrier 14 may have to be altered to prevent a particularly fine fill material from falling into the reservoir 14.

Depending on the circumstances it may be appropriate to provide a conduit entrance and exit such as 28 and 30 into the containment pan 10 and out of the island 12 for a pipe conduit 32 which may include electrical, fuel and/or vapor return piping or wiring. Another conduit 36 can be run from above ground to the island level 24 to the reservoir 16.

Conduit 36 can be comprised of iron, steel or any other appropriate material. Conduit 36 allows for the mounting of a fluid extraction tube 34 and/or a liquid level signal switch comprising the preferred embodiment of 40, 42, 44, 46, 47 and 48 therein. The conduit 36 prevents outside elements from eroding, corroding, or otherwise compromising the extraction tube 34 and fluid signal switch elements 40, 42, 44, 46, 47, 48 and 49. The opening 54 of conduit 36 can be placed at a generally desirable level including island level, below or above island level, or under or inside the dispenser. The length of extraction tube 34 liquid fluid switch and dowel 42 can also be altered to compensate for variations of the length of conduit 36. If a conduit 36 is utilized, then an aperture 39 must be made in the filter barrier 14 in order to allow access into containment reservoir 16. It is appropriate to place a bonding, welding or other similar material about the circumference of conduit 36 where it abuts perforated barrier 14.

It is also appropriate in the present invention to provide a means for extracting any accumulated liquid. Within the preferred embodiment of FIG. 1 this is accomplished by a fixed hollow tube 34 which reaches from the island level 24 through the fill material 22 into the accumulated liquid 20. The extraction tube 34 will normally run within conduit 36 which protects the extraction tube 34 from filler material 22. It is appropriate to fixedly attach the extraction tube 34 to the inner wall of conduit 36 by virtue of brackets 38 or similar devices.

The preferred embodiment can also be designed and wired to utilize an intrinsicly safe liquid level signal switch. The signal switch of the preferred embodiment described is comprised of a float 40, dowel 42, brackets 44 which slidably receive dowel 42 and a pressure sensitive signal switch 46. Wiring 48 for said switch 46 is threaded through conduit 36 at aperture 50. The signal switch 46 is fixed to the inner diameter walls of the conduit 36 by virtue of bracket 49.

The float 40 is affixed to the bottom of dowel 42 such that dowel 42 is vertically perpendicularly upward from the float 40. While float 40 of the present invention of the preferred embodiment is disclosed as being square, it could be any other shape desired. Also, float 40 can be comprised of any suitable material which will maintain ballast but will be relatively unaffected by continual submergence or partial submergence in flammable fluids such as gasoline. If the present invention is used with a nonflammable liquid, then such precaution is unnecessary. At least two brackets 44 should be utilized to slidably hold dowel 42. Dowel 42 should be a sufficient length such that when all liquid has been emptied from the fluid containment reservoir 16 the top of dowel 42 will not fall below the uppermost bracket 44.

Figure 2:
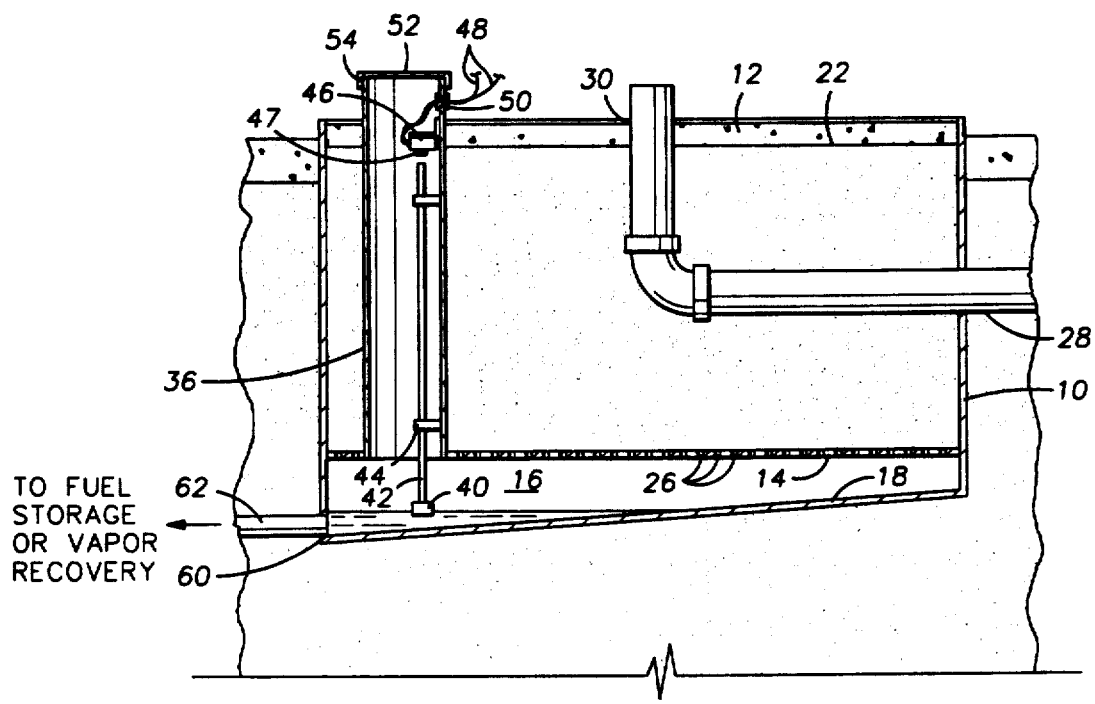
FIG. 2 is an alternative embodiment of the under-dispenser containment apparatus of the present invention.

An alternative embodiment of the present invention is set forth in FIG. 2. This embodiment shows a drain 60 utilized instead of the extraction tube 34 in order to eliminate build up of fluid 20 in the containment pan reservoir 16. The drain 60 would preferably be in communication with a conduit 62 which would subsequently flow back into a fuel storage tank (not shown). The conduit 62 could also lead to a vapor recovery line, or any other collection reservoir.

In the preferred embodiment, each bracket 44 contains an aperture 45 through which dowel 42 may pass. If a drain 60 with conduit 62 is utilized as disclosed in FIG. 2, and a decision is made to forego the use of an extracting tube 34 and/or the liquid level signal switch system 40, 42, 44, 45, 46, 47, 48, and 49 then it would also be appropriate to eliminate conduit 36.

Figure 3:
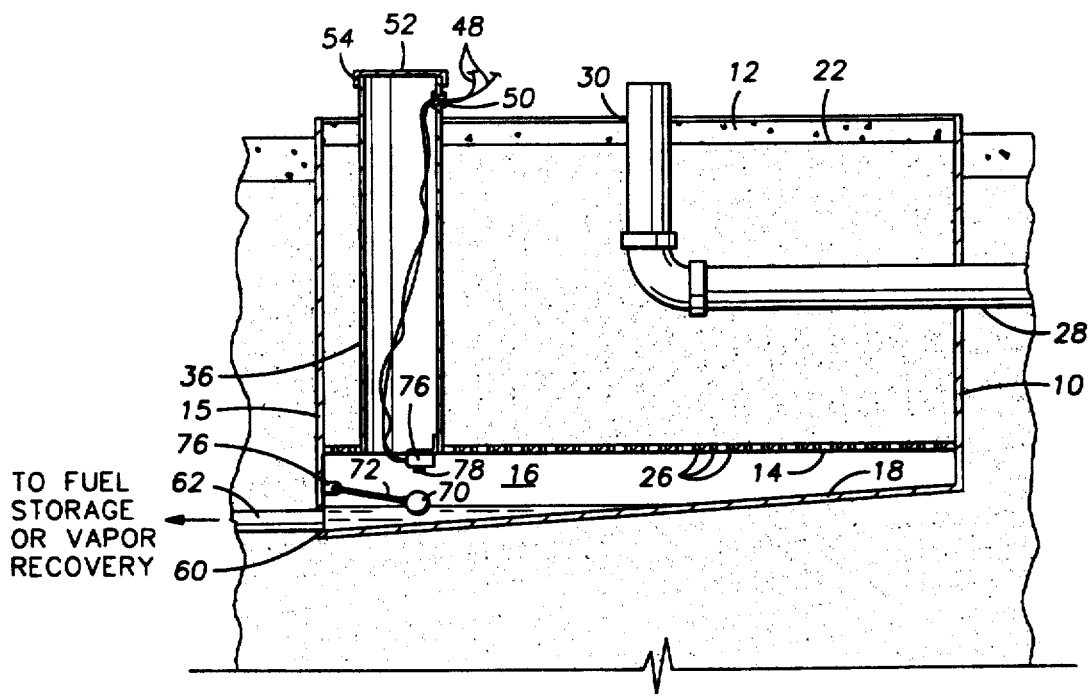
FIG. 3 is another alternative of embodiment of the under-dispenser containment apparatus of the present invention.

In another alternative embodiment, a fluid level switch device could be arranged completely below the perforated filter 26. As disclosed in FIG. 3, this arrangement could be comprised of a float 70 fixedly attached to the end of arm 72 which is in turn hingedly attached at 74 to wall 15. This float would move upwards as the fluid 20 increased in the containment reservoir 16 until the float 70 itself engaged switch 76 via pressure sensitive switch 78. The wiring 80 could run up through the inside of conduit 36.

When enough liquid 20 has accumulated such that the fluid level rises, float 40 will rise with the fluid level. As float 40 rises, dowel 42 is pushed upward until it directly abuts switch 46. Pressure sensitive switch 46 incorporates a pressure button 47 which is pressed by dowel 42. At that point the system can be wired for a number of possibilities including visual and/or audio alarm.

Another possibility is to wire the fluid level switch to an impact valve (not shown) for the fuel dispenser 11. Each fuel dispenser or series of fuel dispensers contain such a valve. Such an arrangement would allow for the automatic shut off of fuel to the dispenser 12 once the fluid 20 arises to a predetermined level normally no more than one-half a gallon.

The liquid extraction tube 34 as well as the intrinsic-safe liquid level signal switch device 46 and related elements are all preferably mounted within the conduit 36. Conduit 36 contains a hinged lid 52 in order to protect everything mounted therein. The lid 52 preferably contains an overlapping flange 54 in order to better eliminate the leaking of fluids, more particularly water during rain or the like. It is also preferable to have a spring loaded hinge to eliminate the possibility of the lever 52 remaining open.

The foregoing disclosure and description of the invention are illustrative and explanatory thereof, and various changes in the size, shape, and material, components, circuit elements, wiring connections and various other materials of the preferred embodiment can be made without departing from the spirit of the invention. Thus, while the invention has been described in conjunction with specific embodiments thereof, it is evident that many alternatives, modifications and variations will be apparent to those skilled in the art in light of the foregoing description. Accordingly, this invention is intended to embrace all such alternatives, modifications and variations as fall within the spirit of the invention.

What is claimed is:

1. An under-dispenser containment device for the collection of fuel spillings comprising:
   (a) a means for collecting said spillings from one or more fuel supply devices;
   (b) a collection reservoir integrally attached to said collecting means;
   (c) fill material within said collecting means; and
   (d) a perforated barrier located so as to define the collection reservoir under said barrier and separate fill material from said collection reservoir.

2. The under-disperser containment device of claim 1 further comprising a means for signaling a high fluid level in said collection reservoir of said collecting means.

3. The under-dispenser containment device of claim 1 further comprising a means for extracting spillings collected in said collection reservoir.

4. An under-dispenser containment pan for use with fuel supply devices comprising:
   (a) an open top containment pan placed beneath one or more fuel supply devices;
   (b) a spill collection reservoir at the bottom of said open top containment pan;
   (c) fill material with said containment pan;
   (d) a perforated barrier separating said fill material from said collection reservoir; and,
   (e) a means for extracting spillings collected in said collection reservoir.

5. The under-dispenser device of claim 4 further comprising a means for signaling high liquid levels in said reservoir.

6. The under-dispenser containment device of claim 5 further comprising a hollow vertical conduit surrounding said means for signaling said means for extracting spillings collected in said collection reservoir.

7. The under-dispenser containment device of claim 6 wherein said means for signaling comprises:
   (a) a float resting on the top of any fluid located within said collection reservoir;
   (b) a dowel fixably attached to the top of said float and generally perpendicular thereto;
   (c) a means for slidably mounting said dowel to the inside of said vertical conduit; and,
   (d) a pressure sensitive electronic switch which responds to pressure exerted by said dowel, said switch also mounted within said vertical conduit at a predetermined point such that once the fluid level rises to a certain point the float rises along with said dowel which communicates with said pressure sensitive switch.

8. The under-dispenser containment device of claim 7 wherein said pressure sensitive electronic switch is intrinsicly safe.

9. The under-dispenser containment device of claim 6 wherein said means for extracting comprises a hollow pipe rising vertically from the floor of said containment reservoir through said vertical conduit to a predetermined point such that access can be made to said pipe from ground level.

10. The under-dispenser containment device of claim 5 wherein said means for signalling comprises:
 (a) a vertically extending arm horizontally attached to the inside side of said containment pan;
 (b) a float fixedly attached to the end of said arm opposite said hinged attachment to said containment pan; and,
 (c) a pressure sensitive electronic switch which responds to pressure exerted by said float, said switch mounted such that when said float rises to a predetermined level, said float engages said pressure sensitive switch.

11. The under-dispenser containment device of claim 5 wherein said means for extracting spillings collected in said collection reservoir comprises a drain in the bottom of said collection reservoir.

12. The under-dispenser containment device of claim 5 wherein said means for signalling shuts down said fuel supply devices when engaged.

* * * * *